United States Patent
Wu et al.

(10) Patent No.: US 10,612,261 B2
(45) Date of Patent: Apr. 7, 2020

(54) AGV COMB-TYPE TRANSFER ROBOT

(71) Applicant: SHENZHEN YEEFUNG ROBOTICS & DYNAMICS LTD., Shenzhen (CN)

(72) Inventors: Hao Wu, Shenzhen (CN); Yingjie Cai, Shenzhen (CN); Sihan Fang, Shenzhen (CN); Jingyang Que, Shenzhen (CN)

(73) Assignee: SHENZHEN YEEFUNG ROBOTICS & DYNAMICS LTD., Shenzhen, Guangdong (CN)

( * ) Notice: Subject to any disclaimer, the term of this patent is extended or adjusted under 35 U.S.C. 154(b) by 322 days.

(21) Appl. No.: 15/735,142

(22) PCT Filed: Jan. 19, 2016

(86) PCT No.: PCT/CN2016/071387
§ 371 (c)(1),
(2) Date: Dec. 8, 2017

(87) PCT Pub. No.: WO2016/197610
PCT Pub. Date: Dec. 15, 2016

(65) Prior Publication Data
US 2018/0135328 A1    May 17, 2018

(30) Foreign Application Priority Data
Jun. 10, 2015    (CN) .......................... 2015 1 03176560

(51) Int. Cl.
*E04H 6/00*    (2006.01)
*B65G 1/00*    (2006.01)
(Continued)

(52) U.S. Cl.
CPC ................. *E04H 6/34* (2013.01); *B65G 1/04* (2013.01); *E04H 6/307* (2013.01); *E04H 6/36* (2013.01);
(Continued)

(58) Field of Classification Search
USPC .......... 700/245–264; 701/2, 23–28, 400–409
See application file for complete search history.

(56) References Cited

U.S. PATENT DOCUMENTS

| | | | |
|---|---|---|---|
| 6,325,586 B1* | 12/2001 | Loy | B65G 1/02 414/281 |
| 2005/0047895 A1* | 3/2005 | Lert, Jr. | B65G 1/0492 414/273 |

(Continued)

FOREIGN PATENT DOCUMENTS

| | | |
|---|---|---|
| CN | 1095445 A | 11/1994 |
| CN | 101173572 A | 5/2008 |

(Continued)

OTHER PUBLICATIONS

International Search Report for PCT/CN2016/071387 dated Apr. 25, 2016, and its English translation provided by WIPO.

(Continued)

*Primary Examiner* — Jonathan L Sample
(74) *Attorney, Agent, or Firm* — Ladas & Parry, LLP

(57) ABSTRACT

An AGV comb-type transfer robot, comprising: a lifting frame (2), comb teeth being mounted on the lifting frame (2); and a traveling frame (1), a comb tooth lifting apparatus (15) being mounted on the traveling frame (1), and a traveling drive mechanism (13) and a central control system being mounted in the traveling frame (1). The comb tooth lifting apparatus (15) comprises a lifting drive motor (151) and a gear set (152) in transmission connection with the motor (151). The traveling drive mechanism (13) comprises a traveling drive motor and a traveling wheel set mounted in the traveling frame (1). The present invention also relates to a method for storing and retrieving a vehicle using the robot. The transfer efficiency and intelligent level of the robot are high.

7 Claims, 7 Drawing Sheets

(51) Int. Cl.
    *E04H 6/34*     (2006.01)
    *E04H 6/36*     (2006.01)
    *E04H 6/30*     (2006.01)
    *E04H 6/42*     (2006.01)
    *G05D 1/02*     (2020.01)
    *B65G 1/04*     (2006.01)

(52) U.S. Cl.
    CPC ............. *E04H 6/422* (2013.01); *E04H 6/424* (2013.01); *G05D 1/024* (2013.01); *G05D 1/0214* (2013.01); *G05D 1/0225* (2013.01); *G05D 1/0236* (2013.01); *G05D 1/0259* (2013.01); *G05D 1/0272* (2013.01); *G05D 2201/0216* (2013.01)

(56) References Cited

U.S. PATENT DOCUMENTS

| | | | |
|---|---|---|---|
| 2005/0131645 A1* | 6/2005 | Panopoulos | B60P 1/5457 701/472 |
| 2009/0074545 A1* | 3/2009 | Lert, Jr. | B65G 1/0492 414/276 |
| 2010/0076591 A1* | 3/2010 | Lert, Jr. | B65G 1/1378 700/216 |
| 2010/0183409 A1* | 7/2010 | Checketts | G05D 1/0297 414/231 |
| 2012/0189409 A1* | 7/2012 | Toebes | B65G 1/0492 414/273 |
| 2013/0183124 A1 | 7/2013 | Wastel | |
| 2014/0277691 A1* | 9/2014 | Jacobus | G06Q 10/087 700/216 |
| 2017/0226764 A1* | 8/2017 | Nussbaum | E04H 6/18 |

FOREIGN PATENT DOCUMENTS

| | | |
|---|---|---|
| CN | 202596227 U | 12/2012 |
| CN | 202658933 U | 1/2013 |
| CN | 202995460 U | 6/2013 |
| CN | 104153617 A | 11/2014 |
| CN | 104912372 A | 9/2015 |
| CN | 204715836 U | 10/2015 |
| JP | 2011106124 A | 6/2011 |
| WO | 2014127721 A2 | 8/2014 |

OTHER PUBLICATIONS

Written Opinion of the International Search Authority PCT/CN2016/071387 dated Apr. 25, 2016, and its English translation from Bing.com Microsoft Translator.

From Chinese patent application No. 20151031765.6, 1$^{st}$ office action, dated Jan. 8, 2016, with an English Translation from Espacenet Global Dossier.

From Chinese patent application No. 20151031765.6, 2nd office action, dated Dec. 23, 2016, with an English Translation from Espacenet Global Dossier.

From Chinese patent application No. 20151031765.6, First Search Report, dated Jul. 26, 2016.

\* cited by examiner

AGV COMB-TYPE TRANSFER ROBOT

CROSS REFERENCE TO RELATED APPLICATIONS

This application is the U.S. national phase of PCT Application No. PCT/CN2016/071387 filed on Jan. 19, 2016, which claims priority to Chinese Patent Application No. 201510317656.0 filed on Jun. 10, 2015, the disclosures of which are incorporated herein by reference in their entireties.

TECHNICAL FIELD

The present invention relates to vehicle transfer equipment, in particular to an AGV (Automated Guided Vehicle) comb-type transfer robot, and is applicable to the technical field of vehicle transfer.

BACKGROUND ART

With rapid popularization and development of automobiles, the supply of urban parking spaces is severely insufficient, and the requirement for parking spaces becomes greater and greater, therefore, the traditional parking mode gradually develops towards the mode of intelligent and mechanical stereo parking. The existing fully-automatic stereo garages are mainly divided into three types: planar moving garages, roadway stacking garages and vertical lifting garages. Simply speaking, their working principle is as follows: one or multiple transfer devices are available to lift up a vehicle from the bottom of the vehicle for transfer, and then move to a lifter together, the lifter then transfers the transfer device and the vehicle to different parking layers, and then the transfer device sends the vehicle to a designated parking space.

Comb-type vehicle transfer is the most frequently used vehicle transfer manner in the existing stereo garage. The comb of the comb-type transfer device is arranged on a vehicle carrying platform, the vehicle carrying platform is moved to the parking position via a lifting transverse shifting device, the comb of the parking position is staggered with the comb on the vehicle carrying platform, the comb continues to descend to return back to the vehicle carrying platform, and then the vehicle is placed in the parking position. When the comb is used to replace the vehicle carrying board, as such a transfer device is free from back and forth transmittance of the vehicle carrying board, the operation efficiency is high.

A patent entitled "Comb-type exchange vehicle transfer robot with automatic centering and locating apparatus" with the application number of 201220144962.0 discloses the following contents: a comb-type exchange vehicle transfer robot with an automatic centering and orientating apparatus, comprising an underframe (1) arranged on a track (20), a bi-directional travelling mechanism mounted on the underframe (1), a lifting comb-type frame (2) and a lifting mechanism, wherein the lifting comb-type frame (2) is mounted with a vehicle centering and orientating apparatus which is composed of two sets of centering drive apparatuses (11), centering installation pieces (9), centering pull rods (10) and push plates (19) mounted respectively in the front and rear parts, the centering drive apparatus (11) is mounted on the lifting comb-type frame (2), the centering drive apparatus (11) is mounted with a centering installation piece (9) and drives the rotation of the centering installation piece (9), a pair of centering pull rods (10) are symmetrically hinged on the centering installation piece (9), the two hinged points are not overlapped with the installation point of the centering installation piece (9) on the centering drive apparatus (11), the connection line between the two hinged points gets through the installation point, and the other ends of the centering pull rods (10) are respectively provided with push plates (19).

A patent entitled "Comb-type storage and retrieval mechanism in stereo parking lot or storage field" with the application number of 93105031.6 discloses the following contents: a comb-type storage and retrieval mechanism in an automated stereo parking lot or a storage field is mainly composed of a lateral transferring trolley, a storage and retrieval trolley and a comb-type lifting mechanism, wherein the front and rear parts of the two side edges of the lateral transferring trolley are respectively provided with two or several track wheels, the track wheels are mounted on the two horizontal tracks which are fixedly arranged on the central passage in each floor of the parking lot or the storage field; a drive mechanism is respectively fixedly arranged at proper positions of the front and rear ends of the storage and retrieval trolley; and the comb-type lifting mechanism is embedded into a storage and retrieval platform, and is mainly composed of a comb-type lifting platform, a lifting connecting rod group and a lifting drive mechanism.

However, for such comb-type transfer equipment, the intelligence degree is relatively low, a travelling track often needs to be paved and a power supply cable needs to be connected, and the transfer equipment can only realize forward or backward movement, thereby leading to extremely low transfer efficiency, relatively high fault rate, difficulty in realizing efficient operation of the garage, and inability in reflecting intelligent parking in a real sense.

SUMMARY OF THE INVENTION

The objective of the present invention is to provide an AGV comb-type transfer robot aiming at the defects of the prior art. The transfer robot can realize self navigation and free travelling route, and can save space with fast vehicle storage and retrieval, safe performance and convenient maintenance. In future use, the transfer robot can not only be used in the field of parking garages, but also used in ordinary cargo handling.

In order to achieve the above objective, the present invention adopts the following technical solution:

In one aspect, the AGV comb-type transfer robot based on the present invention includes:

a lifting frame, with comb teeth being mounted on the lifting frame;

a travelling frame, with a comb tooth lifting apparatus being mounted on the travelling frame, and a travelling drive mechanism and a central control system being mounted in the travelling frame;

the comb tooth lifting apparatus includes a lifting drive motor and a gear set in transmission connection with the lifting drive motor; the travelling drive mechanism includes a travelling drive motor and a travelling wheel set mounted in the travelling frame to realize omnidirectional travelling.

Preferably, the transfer robot is further mounted with a power supply apparatus, a navigation apparatus and a safety detection apparatus, and the power supply apparatus comprises batteries and a charging mechanism electrically connected with the batteries which are mounted in the travelling frame.

Preferably, the navigation apparatus comprises a laser navigation module mounted in the travelling frame, or a magnetic marker navigation module or an electromagnetic navigation module mounted on the periphery of the travelling frame, or an inertial navigation module mounted in the travelling frame.

Preferably, the safety detection apparatus comprises a laser anti-collision module, a mechanical anti-collision module, an infrared anti-collision module or an ultrasonic anti-collision module which is mounted on the travelling frame for recognizing the objects surrounding the transfer robot.

Preferably, the central control system is composed of a main controller and a travelling module, a transfer module, a guidance and orientation module, a safety module, a power supply and charging management module, a communication module and a human-computer interaction apparatus which are electrically connected with the main controller.

In another aspect, the present invention further relates to a method for storing a vehicle by utilizing the above mentioned AGV comb-type transfer robot, comprising the following steps:

a transfer robot goes below a lifting platform, a main controller controls a lifting drive motor to lift a vehicle, when the vehicle reaches a limited height, a high-position limit switch sends signals to stop lifting;

the transfer robot leaves the lifting platform and transfers the vehicle to a corresponding comb tooth frame of a parking space;

after the transfer robot reaches corresponding comb tooth frame of the parking space, the lifting drive motor inverses, and the vehicle descends to the comb tooth frame of the parking space; and the transfer robot leaves the comb tooth frame of the parking space.

In yet another aspect, the present invention further relates to a method for retrieving a vehicle by utilizing the above mentioned AGV comb-type transfer robot, comprising the following steps:

a dispatching system of an upper computer sends a vehicle retrieval command at corresponding parking space, the transfer robot travels to corresponding parking space from its position after receiving the vehicle retrieval vehicle;

the lifting drive motor drives the lifting frame to ascend, to separate the vehicle from the comb tooth frame of the parking space;

the transfer robot travels to transfer the vehicle out of the comb tooth frame of the parking space; and the transfer robot travels to the lifting platform, the lifting drive motor drives the lifting frame to descend, the vehicle is parked on the comb tooth frame at the entrance and exit, and the transfer robot leaves.

In addition, for vehicle storage and retrieval by utilizing the above AGV comb-type transfer robot.

The AGV comb-type transfer robot for implementing the present invention has the following beneficial effects:

Under the guidance of a control system in a parking lot, the transfer robot in the present invention can realize self navigation and free travelling route, thereby not only saving the space of the parking lot, but also realizing safe and rapid vehicle storage and retrieval with convenient maintenance, and realizing intelligent vehicle parking in a real sense.

Figure 1:
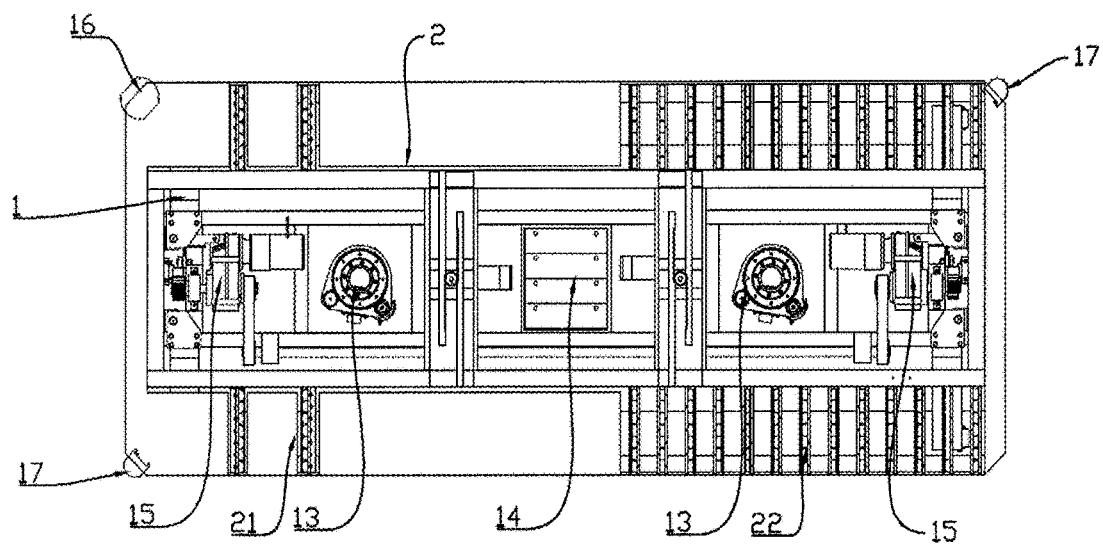
FIG. 1 is a top view of the transfer robot in the present invention.

Reference numerals in the drawings: 1. travelling frame, 13, travelling drive mechanism, 15. comb tooth lifting apparatus, 151. lifting drive motor, 152. gear set, 153. vertical gear, 14. power supply apparatus, 16. laser navigation module, 17. laser anti-collision module, 18. passive travelling wheel, 2. lifting frame, 21. front comb, 22. rear comb.

DETAILED DESCRIPTION OF THE EMBODIMENTS

The embodiments of the present invention will be further described in detail below in combination with the accompanying drawings.

Figure 4:
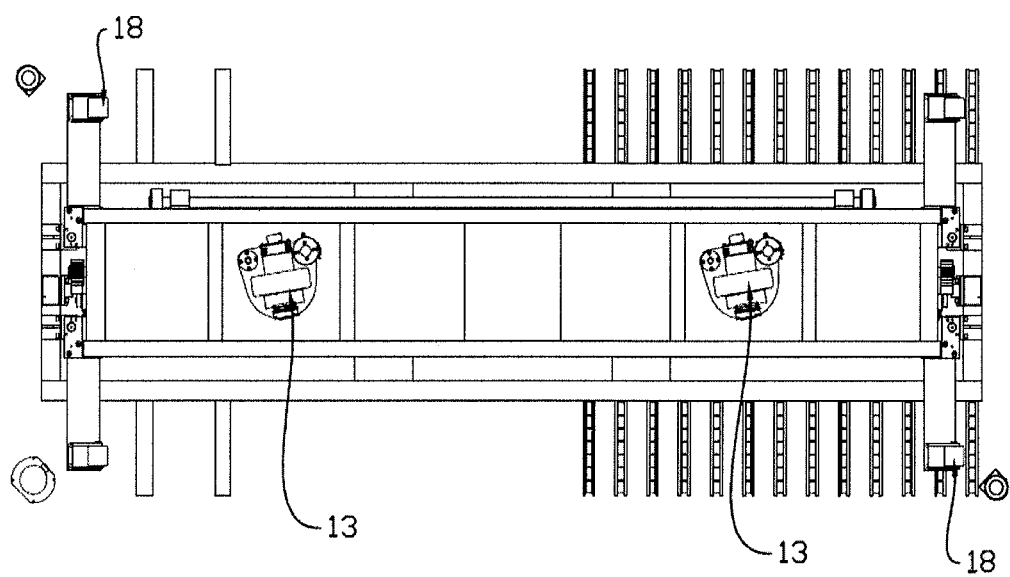
FIG. 4 is a bottom view of the transfer robot in the present invention.

As shown in FIG. 1 and FIG. 4, the comb-type transfer robot includes a lifting frame 2 and a travelling frame 1, wherein the lifting frame 2 is provided thereon with comb teeth for supporting the vehicle wheels, and the comb teeth include a front comb 21 and a rear comb 22. The travelling frame 1 is provided with comb tooth lifting apparatuses 15 which are symmetrically mounted at two ends inside the travelling frame and used for lifting a vehicle, the travelling frame 1 is further internally mounted with a travelling drive mechanism 13, a central control system, a power supply apparatus 14, a navigation apparatus and a safety detection device.

Figure 2:
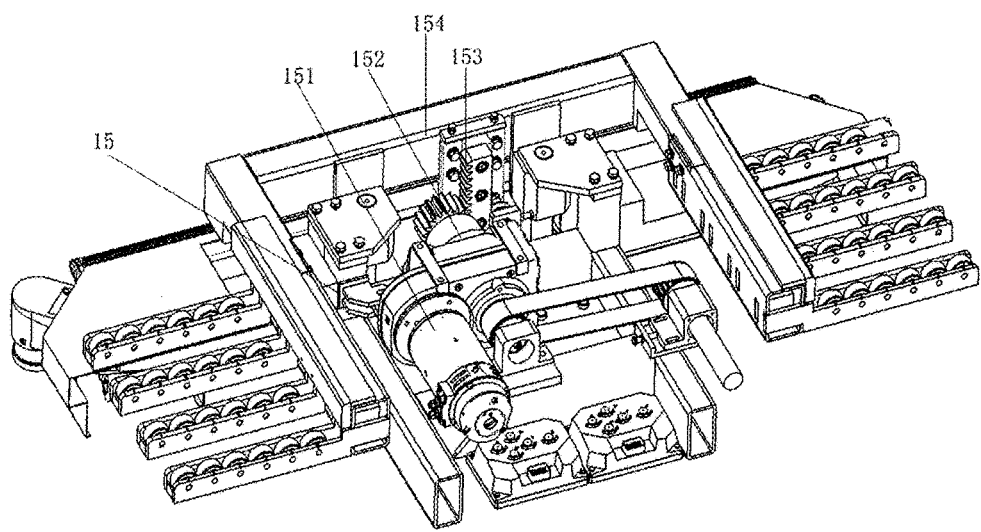
FIG. 2 is a diagram showing the state when the comb teeth of the transfer robot are lifted up.
Figure 3:
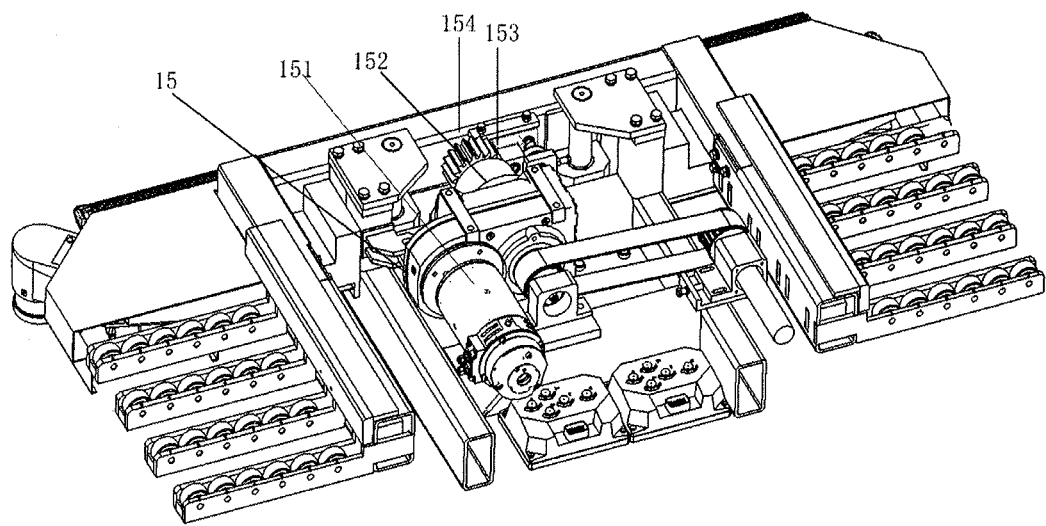
FIG. 3 is a diagram showing the state when the comb teeth of the transfer robot are dropped down.

As shown in FIGS. 1-3, the comb tooth lifting apparatus 15 of the transfer robot includes a lifting drive motor 151 and a gear set 152 in transmission connection with the lifting drive motor, and the gear set 152 is engaged with a vertical gear 153 on a side plate 154 of the lifting frame 2. When the lifting drive motor rotates clockwise, it drives the lifting frame to ascend; and when the lifting drive motor rotates anticlockwise, it drives the lifting frame to descend.

The travelling drive mechanism 13 of the transfer robot includes a travelling drive motor and a travelling wheel set mounted in the travelling frame to realize omnidirectional travelling. Meanwhile, the four corners of the travelling frame of the transfer robot are further provided with four passive travelling wheels 18, so as to coordinate with the travelling of the active travelling wheels and enhance the stability of the transfer robot during travelling.

The power supply apparatus 14 of the transfer robot includes batteries and a charging mechanism electrically connected with the batteries which are mounted in the travelling frame, and the charging interface through which the charging mechanism is connected with an external power supply is arranged on the bottom surface of the frame body, thereby realizing automatic charging of the transfer robot in a parking space in a stereo garage.

The navigation apparatus of the transfer robot includes a laser navigation module 16 mounted in the travelling frame, and the navigation module can also be a magnetic marker navigation module or an electromagnetic navigation module mounted on the periphery of the travelling frame, or an inertial navigation module mounted in the travelling frame, especially a gyroscope.

The principle of the laser navigation module is as follows: multiple artificial markers (such as reflective glue) are arranged in the space where a transfer robot moves, in the travelling process of the robot, the laser navigation module measures the distance and angle of each reflective glue through the transmitted and reflected laser beams, and then obtains its own position information through geometric calculation for position navigation. The safety detection apparatus of the transfer robot includes two laser anti-collision modules 17 which are respectively mounted in the travelling frame, and the anti-collision modules can also be a mechanical anti-collision module or an infrared anti-collision module or an ultrasonic anti-collision module for scanning and recognizing the objects surrounding the transfer robot.

The working principle of the laser anti-collision module is as follows: the laser anti-collision module transmits laser beams to irradiate surrounding objects, recognizes whether barriers exist through detecting the reflected light of the laser beams, and feeds back signals to the control system, such that the control system sends commands to control the travelling and stopping of the robot.

Figure 5:
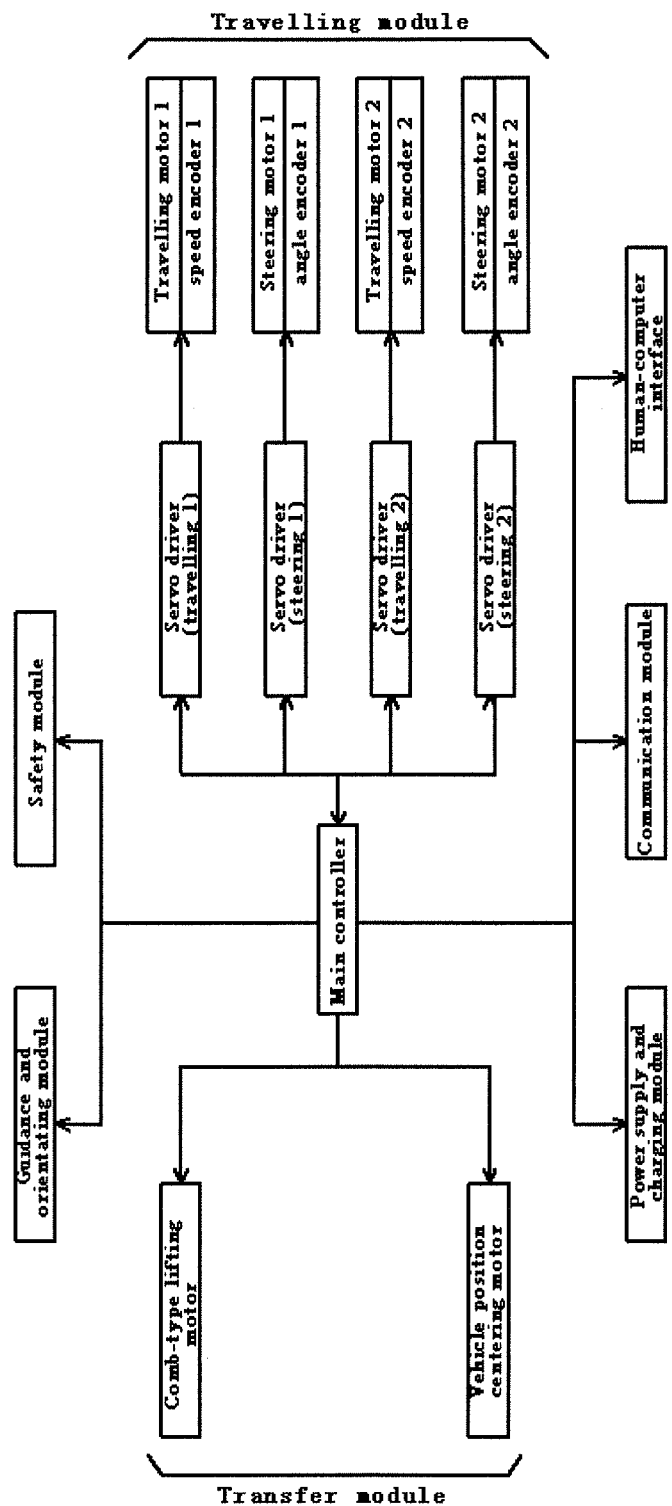
FIG. 5 is a principle diagram of the central control system of the transfer robot in the present invention.

As shown in FIG. 5, the central control system is composed of a main controller and a travelling module, a transfer module, a guidance and orientation module, a safety module, a power supply and charging management module, a communication module and a human-computer interaction apparatus which are electrically connected with the main controller, wherein the travelling module realizes AGV travelling, the drive mode of the travelling module is double-wheel drive, with two drive motors, two steering motors, four servo drivers and four encoders included; the transfer module realizes transfer of a vehicle, and includes a comb tooth lifting motor and a vehicle position centering motor; the guidance and orientation module is used for guiding and orientating the travelling path of the transfer robot; the safety module is used for preventing the transfer robot from being collided with surrounding objects during its travelling to ensure safety; the power supply and charging management module is used for providing and detecting electricity and automatic charging; the communication module is used for conducting wireless communication between the transfer robot and the outside; and the human-computer interaction apparatus is used for setting the parameters of the transfer robot and displaying the operating state of the transfer robot.

The working flow of the guidance and orientation module is introduced below: an upper system sends a task table/travelling segment table through wireless network and broadcasting stations, a communication module monitors these data and stores the data in a segment table queue. An AGV takes out segment table parameters, point information and operation code information from the segment table queue, thereby realizing generation of the speed, determination of a destination point and output of a transfer operation code command. The main controller realizes position calculation with the following principles: two position calculators are adopted to complete the accurate estimation and calculation of the positions, wherein the main position calculator adopts a dead reckoning method, and calculates the theoretic position of the AGV in real time based on the previous position information, encoder information (speed encoder and angle encoder) and kinematic model of a vehicle body. However, as the theoretical position will have an accumulated error along with the elapse of time, so an auxiliary calculator is required for position amendment. The auxiliary position calculator can obtain the real position based on such information as the laser head/magnetic dot sensor of a navigation apparatus. The main controller converts the speed information into electric signals and sends to a steering servo driver and a drive servo driver of the travelling module, and the servo drivers control the motor to complete travelling.

The working flow of using the transfer robot in the present application to store and retrieve a vehicle is as follows:

Vehicle Storage Process:

A transfer robot goes below a lifting platform, a main controller controls a lifting drive motor to lift a vehicle, when the vehicle reaches a limited height, a high-position limit switch sends signals to stop lifting. The transfer robot leaves the lifting platform and transfers the vehicle to a corresponding comb tooth frame of a parking space. After the transfer robot reaches corresponding comb tooth frame of the parking space, the lifting drive motor inverses, and the vehicle descends to the comb tooth frame of the parking space. The transfer robot leaves the comb tooth frame of the parking space and comes to a rest area or a charging area.

Vehicle Retrieval Process:

A dispatching system of an upper computer sends a vehicle retrieval command at corresponding parking space, the transfer robot travels to corresponding parking space from its position (e.g., a rest area or a charging area) after receiving the vehicle retrieval command. The lifting drive motor drives the lifting frame 2 to ascend, to separate the vehicle from the comb tooth frame of the parking space. The transfer robot travels to transfer the vehicle out of the comb tooth frame of the parking space. The transfer robot travels to the lifting platform, the lifting drive motor drives the lifting frame 2 to descend, the vehicle is parked on the comb tooth frame at the entrance and exit, and the transfer robot leaves.

Figure 6:
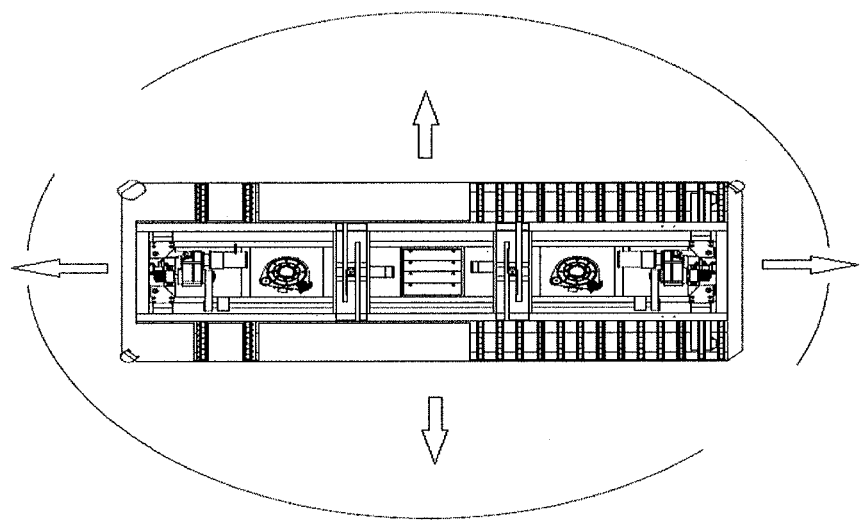
FIG. 6 is a schematic diagram showing the pivot steering of the transfer robot in the present invention.

As shown in FIG. 6, under the guidance of a navigation apparatus, the transfer robot carrying a vehicle can realize such actions as moving forward and backward and pivot steering.

Figure 7:
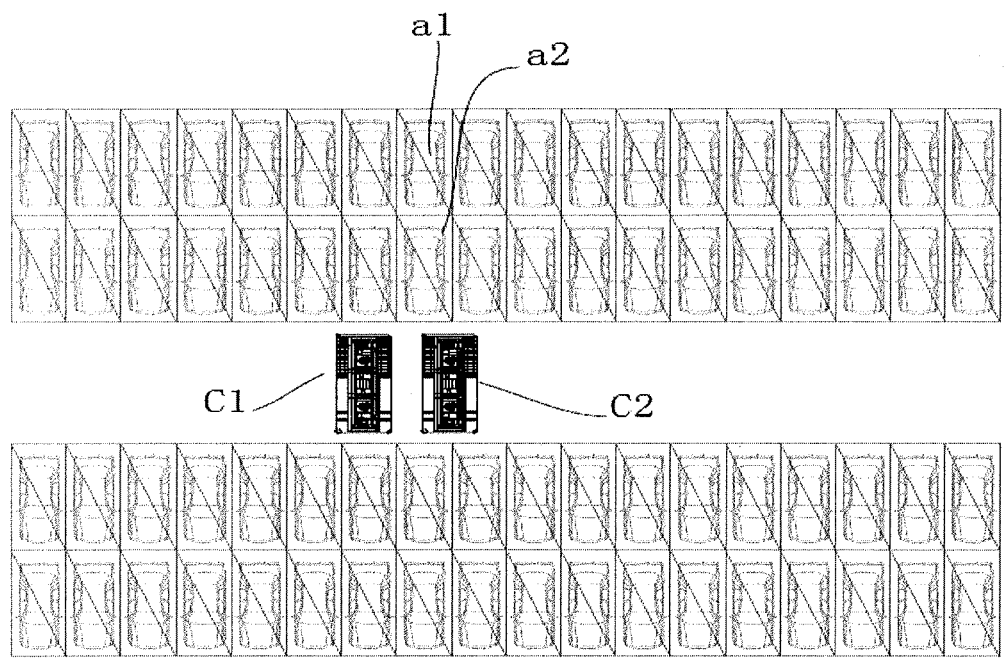
FIG. 7 is schematic diagram 1 showing vehicle transfer in a stereo garage utilizing the transfer robot in the present invention.
Figure 8:
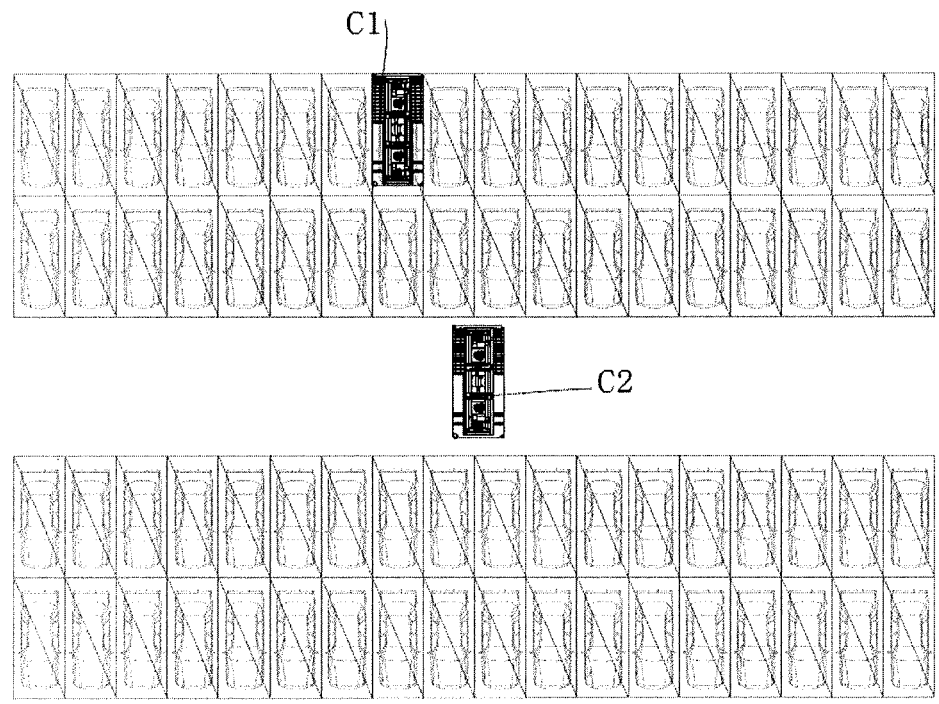
FIG. 8 is schematic diagram 2 showing vehicle transfer in a stereo garage utilizing the transfer robot in the present invention.
Figure 9:
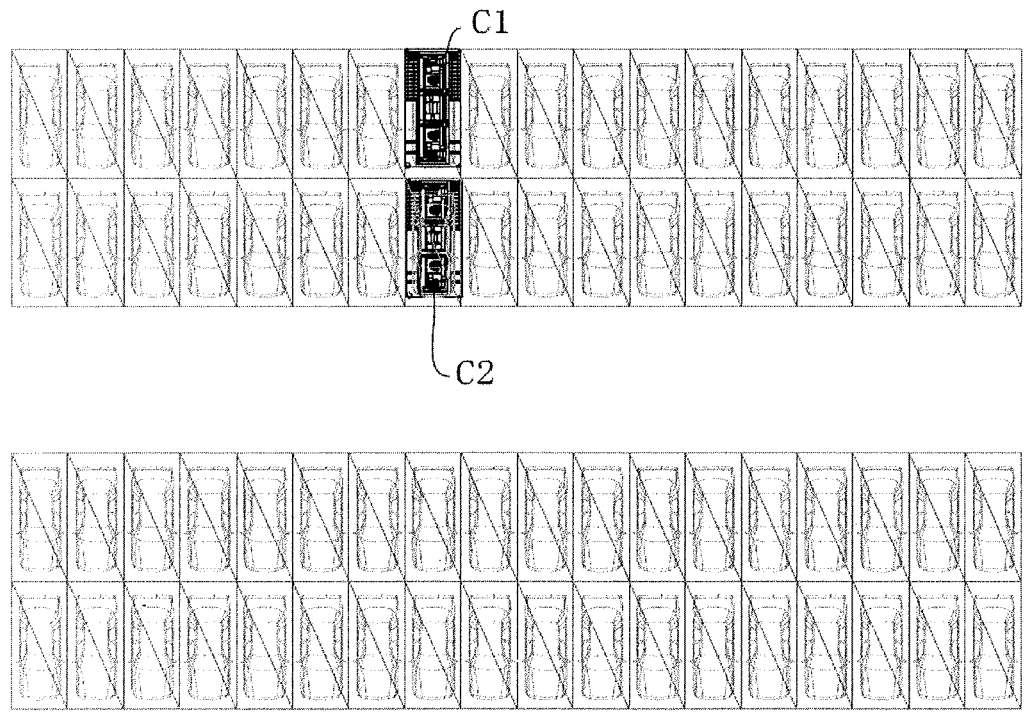
FIG. 9 is schematic diagram 3 showing vehicle transfer in a stereo garage utilizing the transfer robot in the present invention.
Figure 10:
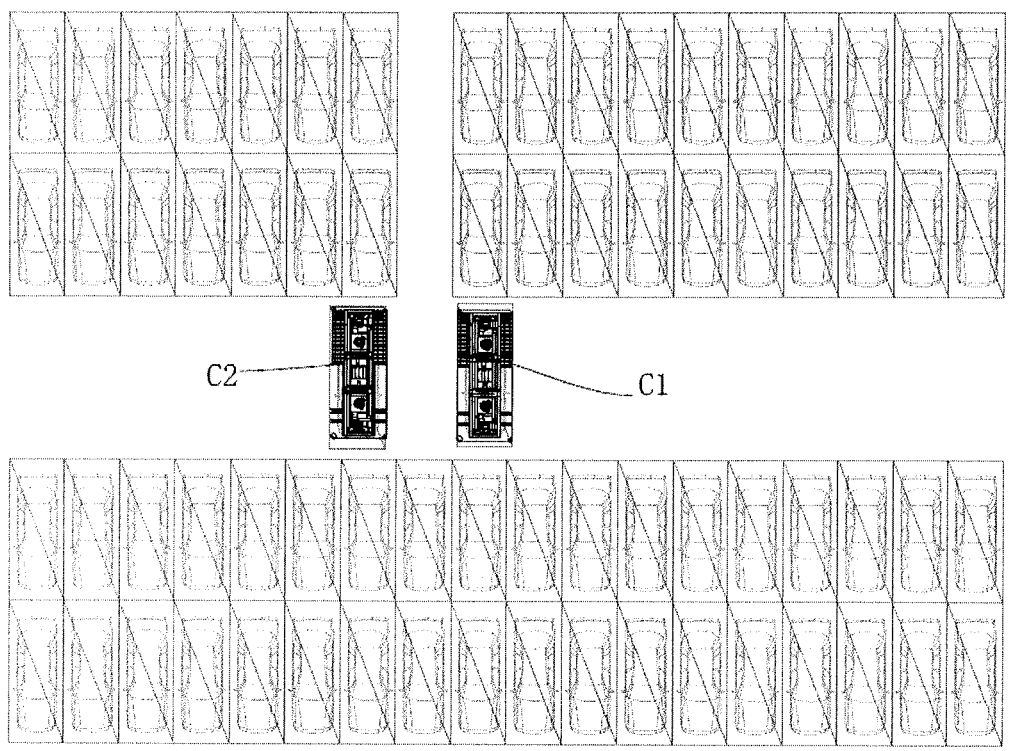
FIG. 10 is schematic diagram 4 showing vehicle transfer in a stereo garage utilizing the transfer robot in the present invention.
Figure 11:
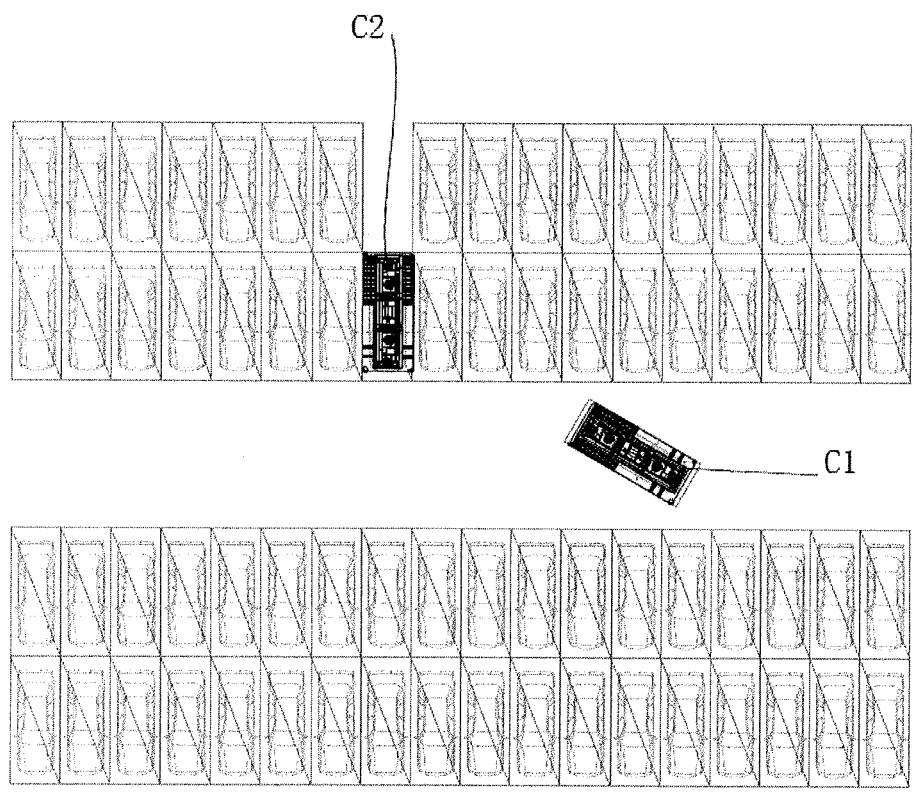
FIG. 11 is schematic diagram 5 showing vehicle transfer in a stereo garage utilizing the transfer robot in the present invention.
Figure 12:
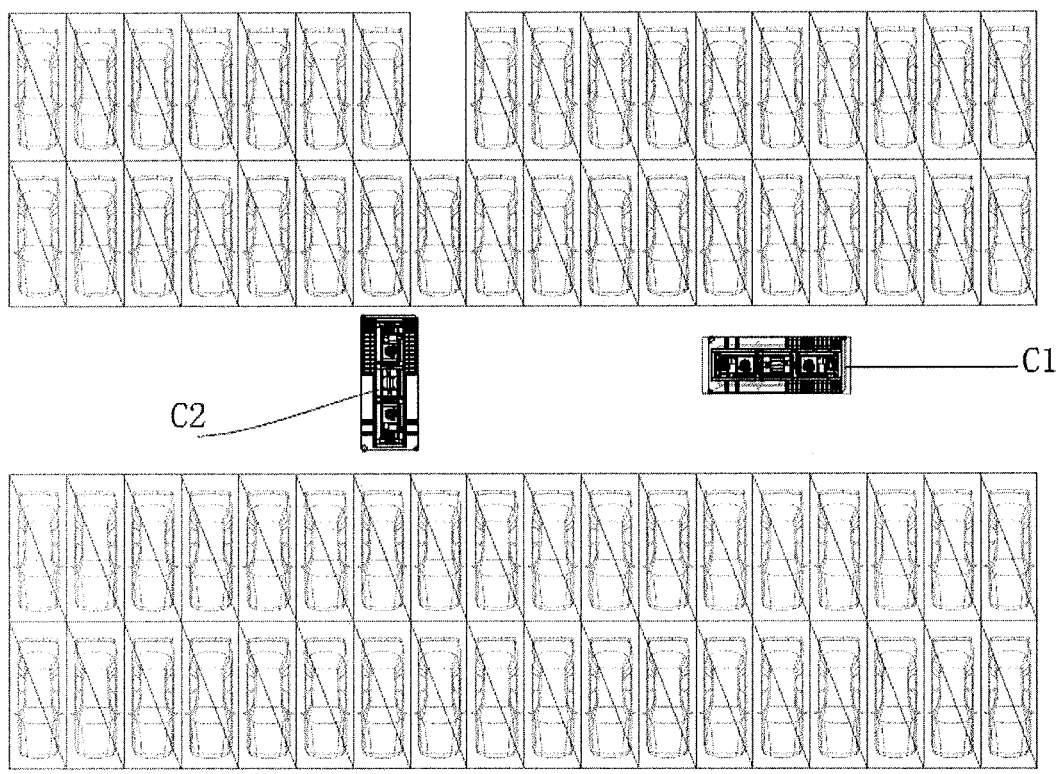
FIG. 12 is schematic diagram 6 showing vehicle transfer in a stereo garage utilizing the transfer robot in the present invention.

The working process of a transfer robot in a parking layer of a stereo garage is described below in combination with FIGS. 7-12:

As shown in FIG. 7, a vehicle in a parking space a1 in a parking lot needs to be transferred out, the transfer robots C1 and C2 travel to the outside of the parking space al, the transfer robot C1 drills into the parking space a1 via the bottom of the vehicle on the parking space a2, the comb teeth of the transfer robot C1 are lifted up to transfer the vehicle on the parking space a1 (as shown in FIG. 8). Then, the transfer robot C2 drills into the bottom of the vehicle on the parking space a2, and transfers the vehicle on the parking space a2 (as shown in FIG. 9). Afterwards, the transfer robots C2 and C1 carrying the vehicle travel out of the parking space successively, and park in the middle roadway (as shown in FIG. 10). Finally, the transfer robot C2 transfers the vehicle back to the parking space a2, lays down the vehicle and leaves the parking space, and comes to the middle roadway to await orders. The transfer robot C1 carries the vehicle for pivot steering and moves the vehicle out of the parking layer (as shown in FIG. 11 and FIG. 12).

It should be emphasized that the above content is a further detailed description of the present invention in combination with specific preferred embodiments, and it cannot be deemed that the specific implementation of the present invention is only limited to these description. For those skilled in the art, numerous simple deductions or substitutions made without departing from the concept of the present invention shall all be deemed as falling within the protection scope of the present invention.

The invention claimed is:

1. An AGV comb-type transfer robot, comprising:
   a lifting frame, with comb teeth being mounted on the lifting frame;
   a travelling frame, with a comb tooth lifting apparatus being mounted on the travelling frame, and a travelling drive mechanism and a central control system being mounted in the travelling frame;
   wherein the comb tooth lifting apparatus comprises a lifting drive motor and a gear set in transmission connection with the lifting drive motor; the travelling drive mechanism comprises a travelling drive motor and a travelling wheel set mounted in the travelling frame, and the travelling drive motor comprises a drive motor and a steering motor to realize omnidirectional travelling;
   wherein the central control system is composed of a main controller and a travelling module, a transfer module, a guidance and orientation module, a safety module, a power supply and charging management module, a communication module and a human-computer interaction apparatus which are electrically connected with the main controller; wherein: the guidance and orientation module is used for guiding and orientating the travelling path of the transfer robot; the safety module is used for preventing the transfer robot from being collided with surrounding objects during its travelling; the communication module is used for conducting wireless communication between the transfer robot and outside; and the human-computer interaction apparatus is used for setting the parameters of the transfer robot and displaying the operating state of the transfer robot;
   wherein the travelling module comprises two drive motors, two steering motors, four servo drivers and four encoders; the transfer module comprises a comb tooth lifting motor and a vehicle position centering motor;
   wherein the guidance and orientation module is used for obtaining segment table parameters, point information and operation code information sent by an upper system, thereby realizing generation of the speed, determination of a destination point and output of a transfer operation code command;
   wherein the main controller is used for completing an accurate estimation and calculation of positions by adopting a main position calculator and an auxiliary position calculator, wherein the main position calculator is used for calculating the theoretic position of the AGV in real time based on the previous position information, encoder information and kinematic model of a vehicle body; the auxiliary position calculator is used for obtaining the real position based on information of a laser head/magnetic dot sensor of a navigation apparatus; the main controller is further used for converting the speed information into electric signals and sending to a steering servo driver and a drive servo driver of the travelling module, and the servo drivers control the motor to complete travelling.

2. The AGV comb-type transfer robot of claim 1, wherein the transfer robot is further mounted with a power supply apparatus, a navigation apparatus and a safety detection apparatus, and the power supply apparatus comprises batteries and a charging mechanism electrically connected with the batteries which are mounted in the travelling frame.

3. The AGV comb-type transfer robot of claim 2, wherein the navigation apparatus comprises a laser navigation module mounted in the travelling frame, or a magnetic marker navigation module or an electromagnetic navigation module mounted on the periphery of the travelling frame, or an inertial navigation module mounted in the travelling frame.

4. The AGV comb-type transfer robot of claim 2, wherein the safety detection apparatus comprises a laser anti-collision module, a mechanical anti-collision module, an infrared anti-collision module or an ultrasonic anti-collision module which is mounted on the travelling frame for recognizing the objects surrounding the transfer robot.

5. The AGV comb-type transfer robot of claim 1, wherein the four corners of the travelling frame are further provided with passive travelling wheels.

6. A method for storing a vehicle by utilizing an AGV comb-type transfer robot of claim 1, comprising the following steps:
   a transfer robot goes below a lifting platform, a main controller controls a lifting drive motor to lift a vehicle, when the vehicle reaches a limited height, a high-position limit switch sends signals to stop lifting;
   the transfer robot leaves the lifting platform and transfers the vehicle to a corresponding comb tooth frame of a parking space;
   after the transfer robot reaches corresponding comb tooth frame of the parking space, the lifting drive motor inverses, and the vehicle descends to the comb tooth frame of the parking space; and
   the transfer robot leaves the comb tooth frame of the parking space.

7. A method for retrieving a vehicle by utilizing an AGV comb-type transfer robot of claim 1, comprising the following steps:
   a dispatching system of an upper computer sends a vehicle retrieval command at corresponding parking space, the transfer robot travels to corresponding parking space from its position after receiving the vehicle retrieval vehicle;
   the lifting drive motor drives the lifting frame to ascend, to separate the vehicle from the comb tooth frame of the parking space;
   the transfer robot travels to transfer the vehicle out of the comb tooth frame of the parking space; and
   the transfer robot travels to the lifting platform, the lifting drive motor drives the lifting frame to descend, the vehicle is parked on the comb tooth frame at the entrance and exit, and the transfer robot leaves.

* * * * *